Feb. 2, 1965  E. VANDER HYDE ETAL  3,168,055
MOVABLE BULKHEAD FOR RAILROAD CARS
Filed May 11, 1964  3 Sheets-Sheet 1
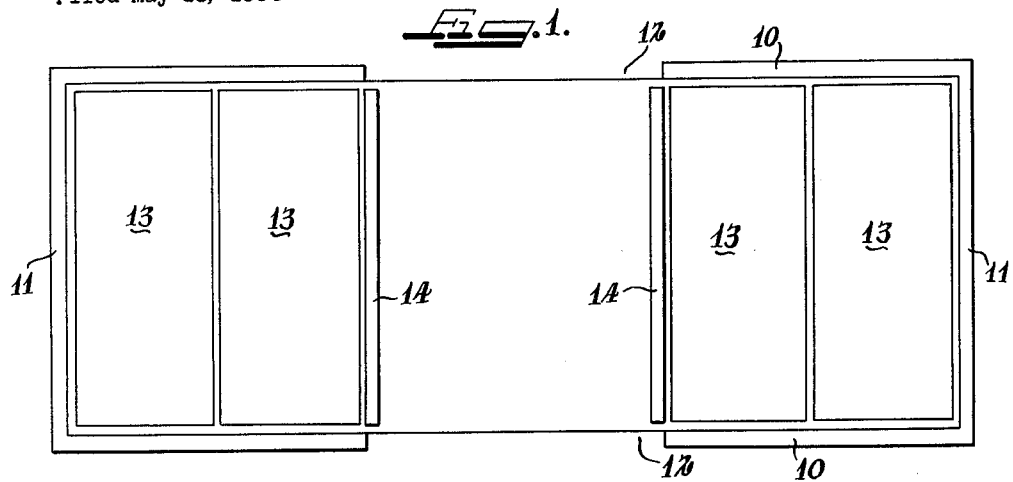
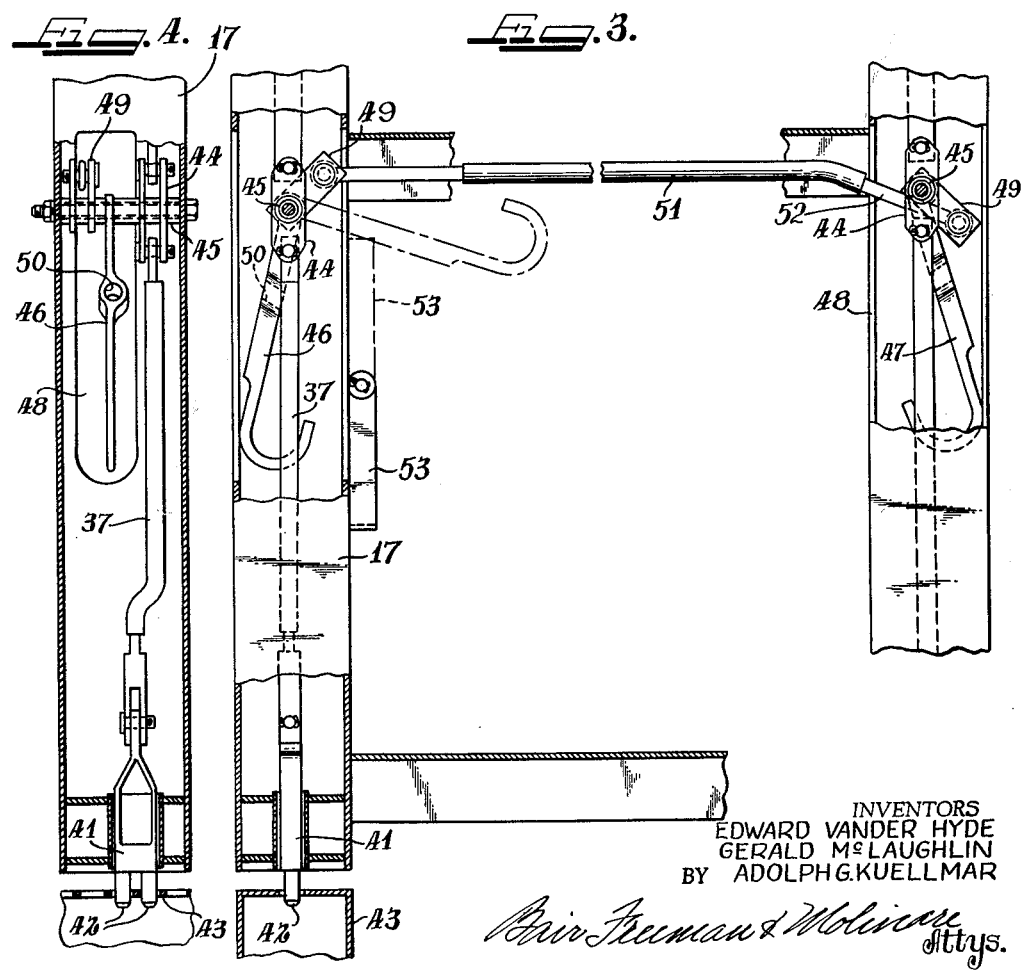
INVENTORS
EDWARD VANDER HYDE
GERALD McLAUGHLIN
BY ADOLPH G. KUELLMAR
Attys.

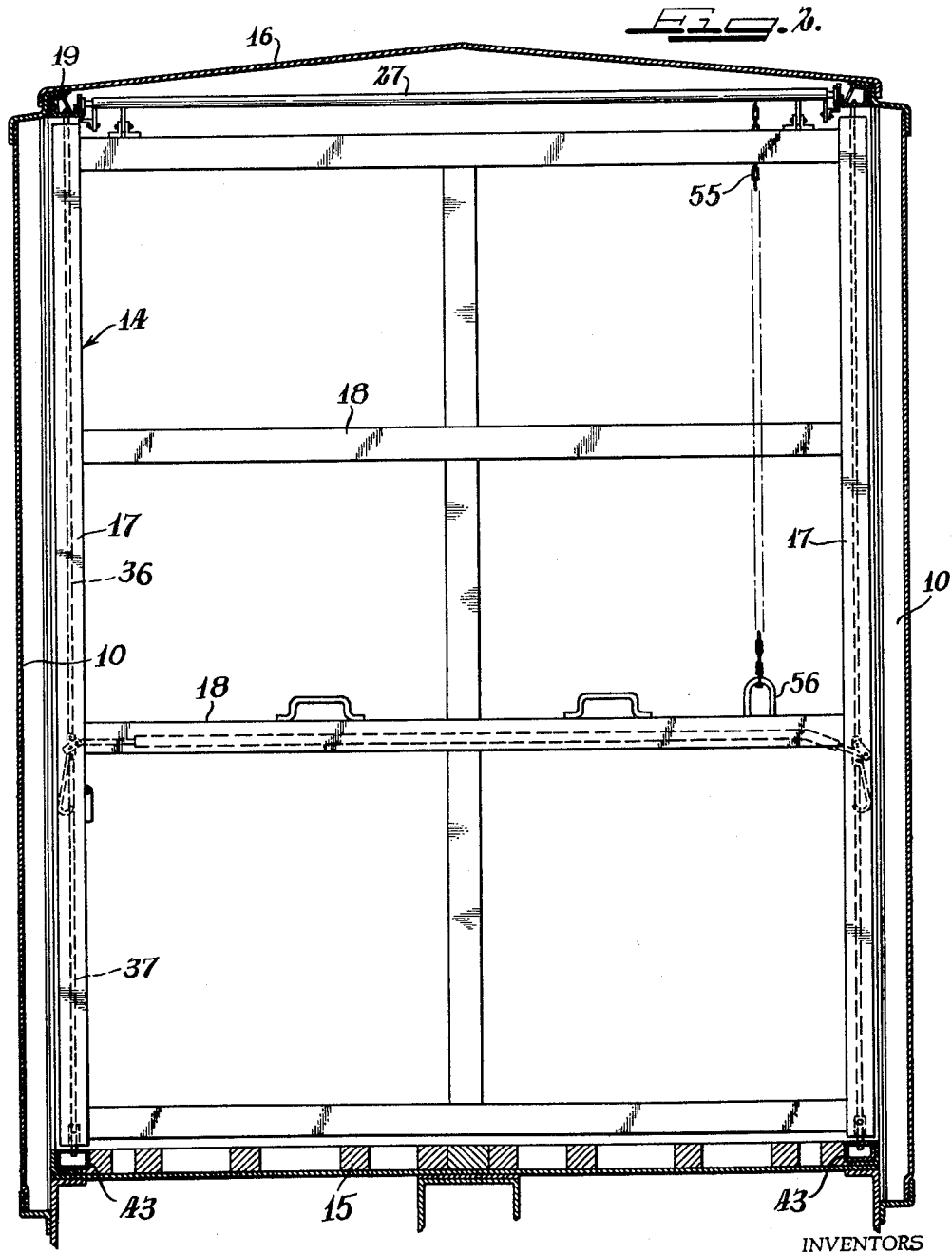

Feb. 2, 1965  E. VANDER HYDE ETAL  3,168,055
MOVABLE BULKHEAD FOR RAILROAD CARS
Filed May 11, 1964  3 Sheets-Sheet 3
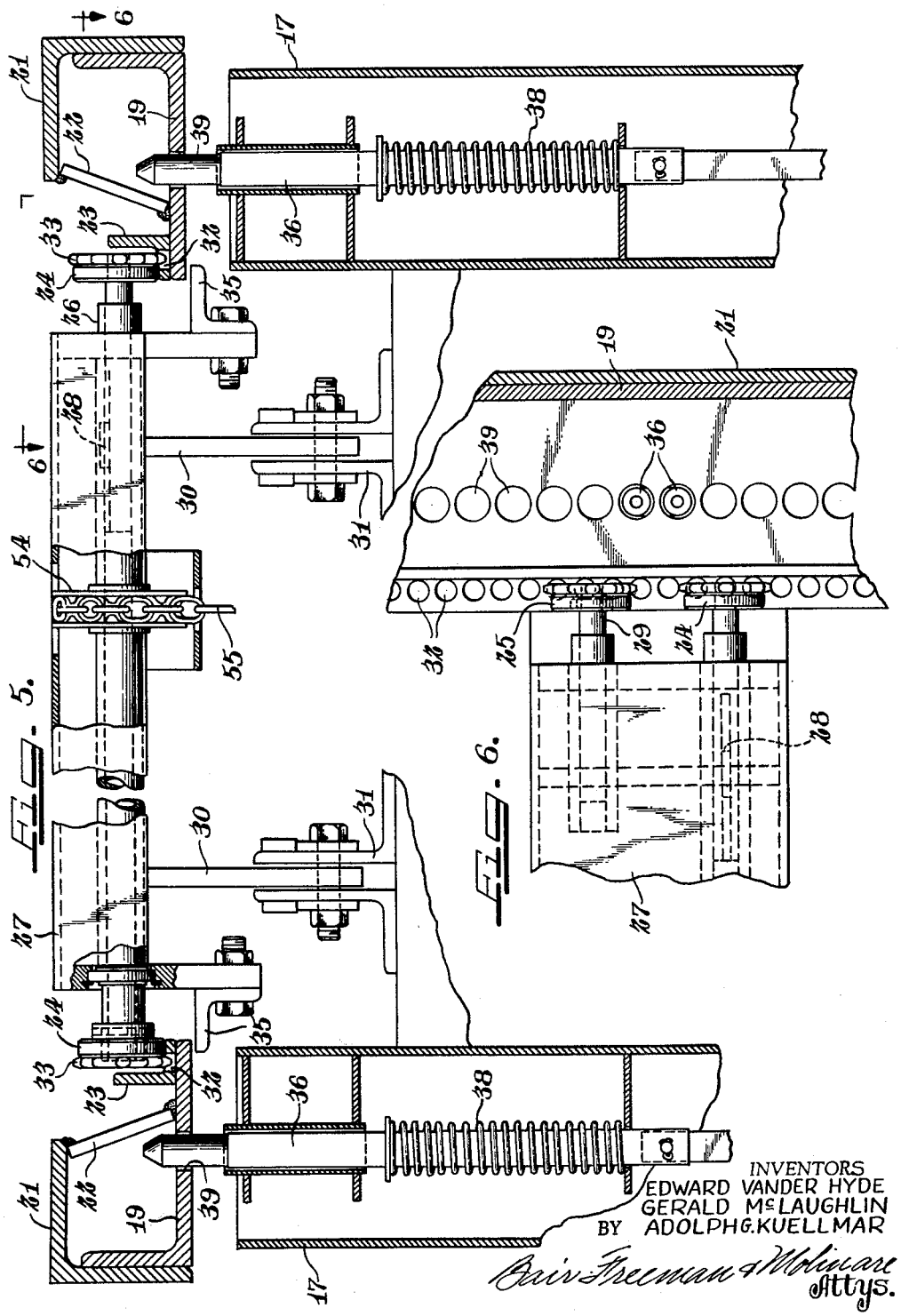
INVENTORS
EDWARD VANDER HYDE
GERALD McLAUGHLIN
BY ADOLPH G. KUELLMAR
Bair Freeman & Molinare
Attys.

United States Patent Office 3,168,055
Patented Feb. 2, 1965

3,168,055
MOVABLE BULKHEAD FOR RAILROAD CARS
Edward Vander Hyde, Chicago, Gerald McLaughlin, Western Springs, and Adolph G. Kuellmar, Blue Island, Ill., assignors to UNARCO Industries, Inc., Chicago, Ill., a corporation of Illinois
Filed May 11, 1964, Ser. No. 366,242
9 Claims. (Cl. 105—376)

This invention relates to movable bulkheads for railroad cars and more particularly to a bulkhead movable to different positions lengthwise of a car to separate the lading therein and to hold it securely against displacement.

In shipping various types of products in railroad freight cars on large pallets and the like, it has been necessary to compartmentize the car to limit shifting of the lading and to reduce the load imposed on the ends of the car. For example, in a car loaded with relatively heavy mechanical parts, shifting of the entire load due to rapid stopping or starting of the car might impose a sufficient load on an end of the car to push it out or at least to bulge it substantially.

It has become current practice to ship various parts, such as automobile parts, stampings and the like and various sub-assemblies, such as fenders, doors, and other body and frame parts, on pallets which extend the full width of a car and which may be stacked vertically to fill substantially the full height of the car. Cars of this type are normally separated into three or more compartments by movable bulkheads supported on tracks near the roof of the car for movement to different positions longitudinally of the car in which they may be latched. These bulkheads engage the pallets and the materials thereon to limit shifting thereof in the car during transport. However, when a car of this type is filled or substantially filled, it may be impossible for the operator to obtain access to the face of the bulkhead to operate the latching mechanism, thereby making both loading and unloading of the car a difficult operation.

It is accordingly an object of the present invention to provide a latch-operating mechanism for a bulkhead which is accessible from either edge of the bulkhead so that the latching mechanism may be operated from either side of the car without the necessity of entering the car.

According to a feature of the invention, the latch-operating mechanism comprises a lever at each edge of the bulkhead swingable inwardly toward the center of the bulkhead with the two levers being interconnected for simultaneous movement.

Another object is to provide a movable bulkhead for railroad cars in which a latch is provided releasably to hold the latch-operating levers in their latch releasing position so that the bulkhead can be manipulated conveniently without requiring that the operator hold the latch-operating lever.

A still further object is to provide a movable bulkhead including propelling means cooperating with the supporting tracks for moving the bulkhead therealong.

The above and other objects and features of the invention will be more readily apparent from the following description when read in connection with the accompanying drawings in which:

FIG. 1 is a diagrammatic plan view of a railroad freight car embodying the invention;

FIG. 2 is a transverse section through a railway car embodying the invention;

FIG. 3 is an enlarged partial section showing the latch-operating mechanism;

FIG. 4 is a partial section looking from the left of FIG. 3;

FIG. 5 is an enlarged partial section illustrating the upper carriage and latch mechanism; and FIG. 6 is a partial view on the line 6—6 of FIG. 5.

FIG. 1 illustrates in outline a railway freight car having side walls 10 and end walls 11 and provided intermediate the length of the side walls with door openings 12. It will be understood that the usual sliding doors are provided to close the openings 12 during transit and that either or both of the doors may be opened when the car is to be loaded or unloaded. The car is adapted to contain lading indicated generally by the blocks 13 which may be in the form of various parts or products carried on elongated pallets which span the full width of the car. It will be understood that these pallets may be stacked vertically to fill substantially the full vertical height of the car. The lading is separated into three or more compartments as shown in FIG. 1 by two or more bulkheads indicated generally at 14 which are movable lengthwise of the car and which can be latched in different positions in the car as required. In the normal use, the bulkheads are positioned approximately as shown so that they lie within the door openings and separate the car into two end compartments and a center or intermediate compartment accessible through the door openings.

The car is more particularly illustrated in FIG. 2 wherein the side walls 10 are shown connected by a floor 15 and a roof 16. The bulkhead 14 is illustrated as made up of side post members 17 extending substantially the full height of the car interior and connected by cross members 18 at various levels to make up the completed bulkhead structure. The posts 17 and cross members 18 are preferably of hollow metal beam construction, as shown, of sufficient size and weight to withstand the stresses imposed thereon during operation of the car although the exact construction of the bulkhead itself is not critical.

The bulkhead is supported for movement lengthwise of the car on carriages as best seen in FIGS. 5 and 6. As shown, angle track members 19 are secured in the upper corner portions of the car and extend lengthwise thereof. These track members may be reinforced by additional angle members 21 and reinforcing plates 22 welded thereto to provide sufficient strength to carry the weight of the bulkhead and to withstand strains imposed on the bulkhead when it is in its latched position. Each of the track members includes an upwardly extending angle strip 23 near its inner edge on the horizontal flange of which supporting rollers 24 and 25 can ride. The rollers 24 at opposite sides of the car are connected for simultaneous rotation by a shaft 26 which is journaled in a housing or beam 27. The shaft 26 is preferably in two sections which are slidably splined or keyed together as shown at 28 so that they can telescope to accommodate variations in spacing of the tracks. The rollers 25 are carried by stub shafts 29 which are journaled in the housing 27 and at least one of which is slidable to accommodate variations in track spacing. The housing 27 carries downwardly extending strips 30 to which brackets 31 on the bulkhead are connected by bolts or the like.

In order to prevent cocking of the bulkhead as it is moved, the track members 23 are formed in their bottom flanges with a series of closely spaced openings 32 in which sprockets 33 ride. The sprockets 33 are secured to the respective rollers 24 and are consequently connected to turn together by the shaft 26. Preferably the housing 27 carries angle brackets 35 extending beneath the tracks 19 to prevent accidental raising of the sprockets 33 to disengage the openings 32.

In order to hold the bulkhead latched in position, each of the posts 17 carries upper and lower latching pins 36 and 37. The upper latching pins 36 are urged upwardly by springs 38 to project through latching openings 39 formed in the track members 19 at spaced points in the length thereof. The lower latch pins 37, as best seen in FIG. 3, carry head members 41 having double latch pins 42 thereon which project downwardly to engage in latching openings in floor latch strips 43 extending lengthwise of the car at the floor level. It will thus be seen that when the latch pins are extended to engage in the tracks and the latch strips 43 the bulkhead will be securely latched in a selected position in the car.

In order to operate the latch pins, their ends are connected to cross pieces 44 secured to tubular shafts 45 mounted in the corner posts 17, as best seen in FIGS. 3 and 4. When the shafts 45 are turned to the position shown in FIGS. 3 and 4, the latch pins will be extended to their latching position and when they are turned through approximately 90° from this position, the latch pins will be retracted against the action of the springs 38.

To turn the shafts 45 and thereby turn the cross members 44, operating levers 46 and 47 are secured to the shafts 45 respectively. Each of the posts 17 is formed in its inner surface with an opening 48 through which the adjacent lever 46 or 47 can be pressed to swing the cross pieces 44 thereby to retract the latch rods. It will be apparent that to accomplish this an operator standing beside the car may simple grasp the adjacent lever 46 or 47 and push it toward the center of the car through the adjacent opening 48 or may insert a crow bar in a socket 50 in the lever for this purpose. Therefore, even if only one door of the car is open the opposite lever adjacent to the closed door will swing inwardly away from the door so that there will be no interference.

To effect simultaneous movement of the levers 46 and 47 thereby to release the latches at both sides of the bulkhead simultaneously, the two shafts 45 are interconnected. For this purpose each shaft carries an outwardly extending arm 49 with the arms on the shafts extending in opposite directions therefrom, as shown in FIG. 3. Thus the arm 49 on the left-hand shaft extends upwardly and inwardly therefrom while the arm 49 on the right-hand shaft extends downwardly and outwardly therefrom. The two arms 49 are connected by a cross rod 51 which is preferably offset at one end, as shown at 52, to connect to the free end of the arm 49 at the right-hand side of the bulkhead, as seen in FIG. 3. This offset not only facilitates interconnection of the arms but also engages the adjacent shaft 45 when the latches are in their engaged positions to limit outward swinging of the operating levers 46 and 47.

In order to hold the latch pins in their released position so that an operator can conveniently manipulate the bulkhead, additional latching means are provided to hold the operating handles in their raised position. As best seen in FIG. 3, this latching means comprises a bar 53 pivoted on one of the side-posts 17 and normally depending as shown in full lines. After the adjacent lever 46 has been raised the bar can be swung up to the position shown in dot-dash lines to support the lever in its raised position. Due to interconnection of levers 46 and 47, this latching means will hold all of the latch pins in their retracted position so that the bulkhead may be moved freely. To release the latching means the operator may reach through the adjacent opening 48 and swing the bar 53 downward so that the operating levers can swing downwardly and the latch pins can be urged to their latched position by the springs 38.

While the bulkhead can be moved in the car when the latch pins are withdrawn from the latching openings merely by pushing in one direction or the other on the bulkhead itself, this is a somewhat awkward and difficult operation. In order to facilitate movement of the bulkhead the shaft 26 is preferably provided with operating means by which it can be turned to turn the sprockets thereby to move the beam or housing 27 along the tracks and shift the bulkhead.

As shown, the operating means comprises a chain driven wheel 54 secured to the shaft 26 intermediate its ends and having a chain 55 looped thereover. Preferably the chain 55 is in the form of a complete loop extending down to a point which can conveniently be reached by an operator standing on the floor of the car. To prevent swaying or tangling of the chain an eyelet 56 may be connected to a cross beam 18 at the lower portion of the bulkhead so that the chain is at a convenient height to be engaged and moved by an operator.

In use, even though the lading in the car is such as to prevent convenient access of an operator into the car, he can still release the latch pins by pushing inwardly on one of the operating levers 46 or 47 which is adjacent to an open door of the car. It will be noted that even though the opposite door is closed, no interference will be created since the lever adjacent to the opposite door will swing inwardly away from the door. The latch bar 53 may then if desired be swung upwardly to hold the operating levers in their generally horizontal position so that the bulkhead is free to move.

At this time the operator may conveniently grasp the chain 55 and pull it in one direction or the other to turn the shaft 26 and the sprockets 33 thereby shifting the bulkhead lengthwise of the car. It will be seen that by this means the bulkhead may be drawn up closely against lading in the car or can easily be moved away from lading in the car with the exertion of minimum effort. When the bulkhead is to be moved appreciable distances the operator may simply push or pull on the bulkhead itself to achieve rapid movement of it. With the bulkhead in the desired position the latch bar 53 may be released and swung downwardly thereby allowing the latch pins to be moved into the latching openings to secure the bulkhead in position.

While one embodiment of the invention has been shown and described in detail, it will be apparent that this is illustrative only and is not to be taken as a definition of the scope of the invention, reference being had for this purpose to the appended claims.

What is claimed is:

1. In a railroad freight car having side walls, a roof and a floor, a movable bulkhead structure comprising tracks adapted to be mounted in a car adjacent to its roof, a bulkhead suspended from the tracks for movement lengthwise of the car, latch strips in the car adjacent to the floor and roof thereof, latch parts movably carried by the bulkhead for engagement with the latch strips to latch the bulkhead in a selected position in the car, and operating means for the latch parts including a lever pivotally mounted at each edge of the bulkhead for swinging in the plane of the bulkhead toward and away from toward the center of the bulkhead and link means connecting the levers to cause them to turn simultaneously in opposite directions.

2. The construction of claim 1 in which the latch parts are disengaged when the levers are swung to a generally horizontal position toward the center of the bulkhead and including a releasable latch engageable with one of the levers to hold it in said position.

3. In a railroad freight car having side walls, a roof and a floor, a movable bulkhead structure comprising tracks adapted to be mounted in a car adjacent to its roof, a bulkhead suspended from the tracks for movement lengthwise of the car, latch strips in the car adjacent to the floor and roof thereof, latch parts movably carried by the bulkhead for engagement with the latch strips to latch the bulkhead in a selected position in the car, operating means for the latch parts including horizontal shafts extending transverse to the bulkhead at the opposite edges thereof, crank members on the shafts, links connecting the crank members to the latch parts to move them when the shafts turn, operating levers secured to the shafts and movable in the plane of the bulkhead toward and away from the center of the bulkhead, arms secured to the shafts, and a link pivoted at its ends to the arms respectively to cause the shafts to turn simultaneously.

4. The construction of claim 3 in which the last named link engages one of the shafts when the levers move to their vertical positions thereby to limit swinging of the levers.

5. The construction of claim 3 including a latch member engageable with one of the levers when it is moved to its position to disengage the latch parts to latch it in that position.

6. In combination with a railroad freight car having side walls, a floor and a roof, elongated tracks secured to the side walls of the car adjacent to the roof, each of the tracks having a horizontal flange formed with a series of spaced latching openings and a series of sprocket openings, an elongated beam extending across the car from one track to the other, rollers on each end of the beam supporting the beam on the tracks for movement lengthwise of the car, a sprocket shaft rotatably mounted on the beam, a sprocket secured to each end of the shaft and meshing respectively with the sprocket openings in the tracks, a telescopically slidable but non-rotatable connection in the shaft whereby the sprockets can move toward and away from each other, a wheel secured to the shaft to drive it, a looped tension member looped over the wheel and depending therefrom for operation by an operator in the car to turn the shaft and thereby to move the beam along the tracks, a bulkhead supported from the beam, latch pins movably carried by the bulkhead for engagement in the latching openings in the tracks, and operating means on the bulkhead to move the latch pins.

7. In combination with a railroad freight car having side walls, a floor and a roof, elongated tracks secured to the side walls of the car adjacent to the roof, each of the tracks having a horizontal flange formed with a series of spaced latching openings and a series of sprocket openings, a beam extending across the car from one track to the other, rollers on each end of the beam supporting the beam on the tracks for movement lengthwise of the car, a sprocket shaft rotatably mounted on the beam, a sprocket secured to each end of the shaft and meshing respectively with the sprocket openings in the tracks, a telescopically slidable but non-rotatable connection in the shaft whereby the sprockets can move toward and away from each other, a wheel secured to the shaft to drive it, a looped tension member looped over the wheel and depending therefrom for operation by an operator in the car to turn the shaft and thereby to move the beam along the tracks, a bulkhead supported from the beam, latch pins movably carried by the bulkhead for engagement in the latching openings in the tracks, a lever pivotally mounted at each edge of the bulkhead for swinging from a generally vertical depending position inwardly toward the center of the bulkhead in the plane of the bulkhead, means connecting the levers to the latch pins to move the latch pins as the levers are moved, and a linkage connecting the levers to cause them to move simultaneously in opposite directions.

8. In combination with a railroad freight car having side walls, a floor and a roof, elongated tracks in the car adjacent to the juncture of the side walls and roof, each of the tracks having a horizontal flange formed with a series of spaced latching openings and a series of spaced sprocket openings, a pair of latching strips in the floor of the car each formed with a series of latching openings, a bulkhead including spaced vertical side posts, a supporting structure for the bulkhead including a roller at each end rolling on the track and a sprocket connected to each roller engaging the sprocket openings, latch pins movably mounted in each of the side posts for movement into and out of latching engagement with the latching openings in the tracks and latching strips, linkage in each of the side posts to move the latch pins therein, a cross link extending between the side posts interconnecting the linkages therein for simultaneous movement, and manual operating means in the side posts connected to the linkages.

9. In combination with a railroad freight car having side walls, a floor and a roof, elongated tracks in the car adjacent to the juncture of the side walls and roof, each of the tracks having a horizontal flange formed with a series of spaced latching openings and a series of spaced sprocket openings, a pair of latching strips in the floor of the car each formed with a series of latching openings, a bulkhead in the car, a supporting structure for the bulkhead extending between and movably supported on the tracks, coaxial supporting wheels and sprocket wheels at the ends of the supporting structure, the supporting wheels riding on the tracks to carry the supporting structure and the sprocket wheels meshing with the sprocket openings, a shaft connecting the sprocket wheels for simultaneous turning, latch pins movably carried by the bulkhead and movable into and out of engagement with the latching openings in the tracks and the latching strips, operating means for the latch pins carried by the bulkhead, and second operating means connected to the shaft to turn it thereby to move the supporting structure and bulkhead in the car.

References Cited by the Examiner
UNITED STATES PATENTS

| | | | |
|---|---|---|---|
| 2,997,966 | 8/61 | Chapin et al. | 105—163 |
| 3,017,842 | 1/62 | Nampa | 105—376 |

ARTHUR L. LA POINT, *Primary Examiner.*